April 10, 1956   J. A. LYNCH   2,741,211
EGG COUNT INDICATING MEANS
Filed Dec. 6, 1954

INVENTOR.
JARMON ALVIS LYNCH
BY
ATTORNEY

United States Patent Office 2,741,211
Patented Apr. 10, 1956

2,741,211
EGG COUNT INDICATING MEANS

Jarmon Alvis Lynch, San Dimas, Calif.

Application December 6, 1954, Serial No. 473,971

3 Claims. (Cl. 116—114)

The present invention relates to count indicating means for battery type lay cages, in which a hen or hens are confined individually or in small groups so that a record of the number of eggs laid during a given period can be obtained. At present the practice in keeping records of the laying of each hen is to mark individual record cards as the eggs are collected each day, and these record cards are generally kept in a small metal bracket attached to the cage.

In accordance with my invention, the record card and the holding brackets are eliminated and a count indicator is attached to or made an integral part of the cage, and this indicating means is provided with a series of indicating stations for a movable indicator. By moving the indicator from station to station the count of eggs can be indicated over a given period. The arrangement is preferably such that as an egg rolls down into the egg tray, which communicates with the bottom of the cage, it is positioned adjacent the counting means so that the count indicator can be moved to a new station at the same time that an egg is picked up from the tray.

The above and other objects of the invention are attained as described in the accompanying specification taken in connection with the drawings, in which.

Figure 1:
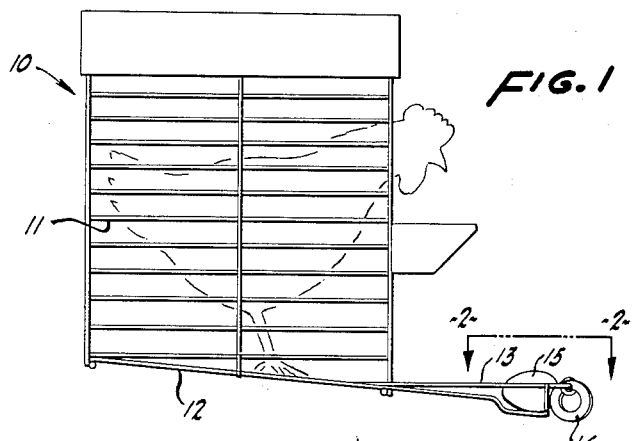
Figure 1 is a side elevational view of a laying cage with the counting means of the instant invention forming a part of the egg tray.
Figure 2:
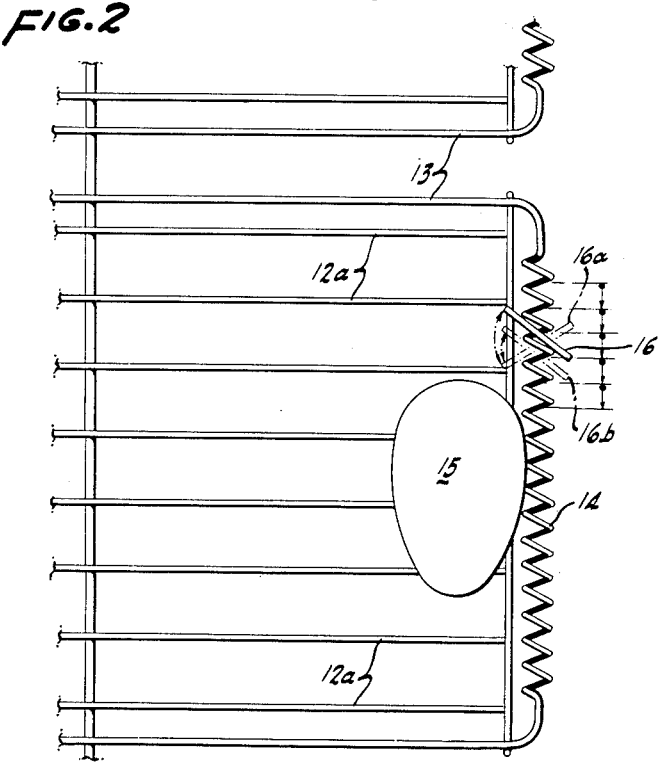
Figure 2 is a fragmentary enlarged plan view of a portion of the egg tray and the counting means.
Figure 3:
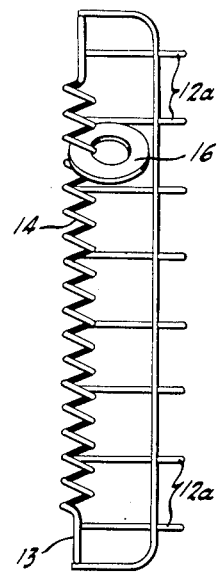
Figure 3 is an end elevational view of one of the egg trays.

Referring to Figures 1, 2 and 3 there is shown a conventional form of lay cage 10 in which a chicken is shown schematically. The cake 10 is fabricated with side walls of wires 11, and a sloping bottom wall of wires 12, and the wires 12 are projected forwardly at 12a from beneath the cage 10 and bent to form an egg tray, the side walls of the egg tray being formed by side wires 13 positioned in elevated relation with respect to the extensions 12a which form the bottom of the tray. The two side wires 13 are preferably integrally connected to a helical coil 14 forming a resilient front wall or limit stop for the eggs in the egg tray. The convolutions of the coil 14 are preferably of such a shape that a space is provided between adjacent convolutions to receive a count indicator 16, which in the present instance is shown as a simple washer.

As indicated by its dotted line positions 16a and 16b, the indicator 16 can be lifted and twisted slightly to fall into the next adjacent convolution of the helical coil 14. By starting the indicator 16 at one end of the coil 14 for a given period, it can be progressed one convolution each time an egg is picked up and thus at any given time provides a direct indication of the number of eggs laid by a hen for a given period.

Figure 4:
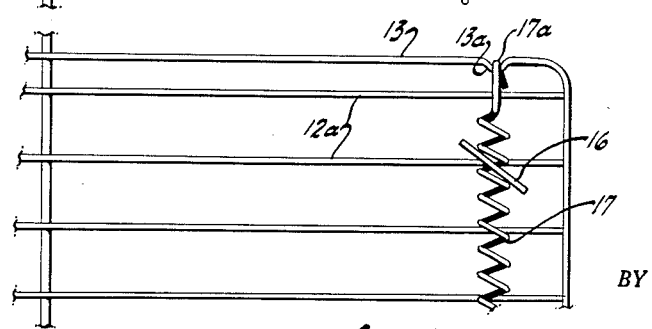
Figure 4 is a fragmentary plan view similar to Figure 2 showing the counting means detachably associated with an egg tray.

Referring to Figure 4, a helical coil 17, which is generally similar to the coil 14 previously described, is shown as an attachment, and is provided with hooked ends 17a which may be engaged with bent portions 13a of the side wires 13. In this way the counting means can be easily applied to any existing cage.

While I have shown and described certain preferred embodiments of my invention, it will be apparent that the invention is capable of modification and variation from the forms shown, so that the scope thereof should be limited only by the scope of the claims appended hereto.

I claim:

1. A count indicating device for a chicken lay cage for indicating the number of eggs laid during a given period by one or more chickens in the cage, said cage having an inclined bottom leading to an egg receiving tray projecting outwardly from the cage, said counting device comprising a helical coil extending across the outer edge of said tray to form a resilient stop for eggs, and an indicator engaged with said coil and movable from convolution to convolution thereof in making a count.

2. A count indicating device for a chicken lay cage as set forth in claim 1 further characterized in that said indicator comprises a washer.

3. A count indicating device for a chicken lay cage as set forth in claim 2 further characterized in that said washer has a width from its inner diameter to its outer diameter substantially equal to the diameter of the convolutions of said helical coil.

References Cited in the file of this patent

UNITED STATES PATENTS

| | | |
|---|---|---|
| 1,206,602 | Scott | Nov. 28, 1916 |
| 2,179,180 | Frazier | Nov. 7, 1939 |
| 2,305,708 | Jacobsen | Dec. 22, 1942 |
| 2,596,688 | Hinsen | May 13, 1952 |
| 2,696,349 | Baumstark | Dec. 7, 1954 |